US012526564B1

(12) United States Patent
Zhao

(10) Patent No.: US 12,526,564 B1
(45) Date of Patent: Jan. 13, 2026

(54) MODULAR OVERHEAD EMBEDDED SPEAKER AND SPEAKER MODULE

(71) Applicant: Huimin Zhao, Shenzhen (CN)

(72) Inventor: Huimin Zhao, Shenzhen (CN)

( * ) Notice: Subject to any disclaimer, the term of this patent is extended or adjusted under 35 U.S.C. 154(b) by 0 days.

(21) Appl. No.: 19/294,345

(22) Filed: Aug. 8, 2025

(51) Int. Cl.
*H04R 1/02* (2006.01)
*H04R 1/28* (2006.01)
*H04R 3/00* (2006.01)

(52) U.S. Cl.
CPC ............. *H04R 1/025* (2013.01); *H04R 1/023* (2013.01); *H04R 1/2834* (2013.01); *H04R 3/00* (2013.01); *H04R 2201/021* (2013.01); *H04R 2201/028* (2013.01); *H04R 2420/07* (2013.01)

(58) Field of Classification Search
CPC ...... H04R 1/025; H04R 1/023; H04R 1/2834; H04R 3/00; H04R 2201/021; H04R 2201/028; H04R 2420/07; H03F 3/21; H03F 2200/03
See application file for complete search history.

(56) References Cited

U.S. PATENT DOCUMENTS 11,622,179 B2 * 4/2023 Christie ................ F21V 21/044 181/150
2008/0298045 A1 * 12/2008 Wright .................. H04R 1/028 362/86
2018/0352313 A1 * 12/2018 Hsu ....................... F21V 23/008
2019/0149902 A1 * 5/2019 Cook ..................... H04R 1/028 381/332

FOREIGN PATENT DOCUMENTS

CN 215499441 U * 1/2022
CN 118921585 A * 11/2024 ............... H04R 1/02
CN 222089715 U * 11/2024

* cited by examiner

*Primary Examiner* — Joseph Saunders, Jr.
(74) *Attorney, Agent, or Firm* — Che-Yang Chen

(57) ABSTRACT

Provided are a modular overhead embedded speaker and a speaker module. The modular overhead embedded speaker includes a base module, and the speaker module which is detachably arranged on the base module; the base module includes a base body on which a through hole and a fastener structure are arranged, the speaker module is arranged at an end part of the through hole by the fastener structure; the speaker module includes a case, a sound production component and an amplification component; an accommodating cavity is formed in the case and has a sound outlet facing the through hole, and an auxiliary window far away from the sound outlet; the sound production component is accommodated in the accommodating cavity and located at the sound outlet; the amplification component is arranged on the case and located at the auxiliary window; the amplification component includes a resonant diaphragm blocking the auxiliary window.

16 Claims, 10 Drawing Sheets

MODULAR OVERHEAD EMBEDDED SPEAKER AND SPEAKER MODULE

FIELD OF THE INVENTION

The present invention relates to the technical field of speakers, and particularly relates to a modular overhead embedded speaker and a speaker module.

BACKGROUND OF THE INVENTION

Speakers are one of the common amplification tools in life, and according to the installation method, they can be divided into ceiling speakers, in-wall speakers, and tower speakers. The ceiling speakers are often installed with occupying floor space, wall hooks, or special brackets, and do not disrupt the aesthetic of the decoration, while allowing for more freedom in placement and a wider sound dispersion range.

However, an existing installation method for the ceiling speakers is typically to use bolts to connect a speaker installing structure to an installation position at the ceiling. This installation method is not only laborious but also prone to damaging the ceiling structure. Furthermore, since the speaker installing structure is usually integrated with the speaker, it is not possible to replace the speaker or its installing structure separately, resulting in poor adaptability. When disassembling, it is needed to disassemble the entire speaker and its installing structure together, and if there is partial damage, a complete replacement is necessary, leading to high repairing cost. Moreover, existing ceiling speakers are limited by the installation environment, resulting in insufficient low-frequency sound wave output and poor bass performance.

Therefore, how to design a modular overhead embedded speaker and a speaker module that not only allow for convenient assembling and disassembling, enabling the individual replacement of the speaker module to decrease repairing cost, but also provide better bass performance, is a technical problem that designers need to solve.

SUMMARY OF THE INVENTION

In terms of defects in related technology, the present invention provides a modular overhead embedded speaker and a speaker module which not only allow for convenient assembling and disassembling, enabling the individual replacement of the speaker module to decrease repairing cost, but also provide better bass performance.

An objective of the present invention is realized by the following technical solution:

a modular overhead embedded speaker includes a base module, and a speaker module which is detachably arranged on the base module;

the base module includes a base body on which a through hole and a fastener structure are arranged, and the speaker module is arranged at an end part of the through hole by the fastener structure;

the speaker module includes: a case, a sound production component and an amplification component; an accommodating cavity is formed in the case and has a sound outlet facing the through hole and an auxiliary window far away from the sound outlet, the sound production component is accommodated in the accommodating cavity and is located at the sound outlet, and the amplification component is arranged on the case and is located at the auxiliary window;

the amplification component includes a resonant diaphragm which blocks the auxiliary window; and the case is provided with a clamping portions at the sound outlet, and the clamping portion is movably connected to the fastener structure.

In one embodiment, the case is provided with a top wall and a side wall, the top wall is opposite to the sound outlet, an arc transition surface is arranged between the top wall and the side wall, and the top wall and the side wall are in curved surface connection by the arc transition surface.

In one embodiment, the fastener structure is provided with a main body portion and at least one elastic portion, the main body portion is an annular sheet and is fixedly connected to the base body, the elastic portion is installed on the main body portion, and the clamping portion is of an annular convex edge structure matched with the elastic portion.

In one embodiment, a plurality of fastener structures are provided and are integrally molded with the base body, and have elasticity; and the clamping portion is of an annular convex edge structure matched with the fastener structures.

In one embodiment, the case is provided with a stepped groove at the edge of the auxiliary window, the resonant diaphragm is provided with a central portion and an edge portion, and the edge portion fits the inner wall of the stepped groove.

In one embodiment, the auxiliary window is located on the top wall, and the center of the auxiliary window coincides with the central axis of the accommodating cavity.

In one embodiment, a plurality of auxiliary windows are provided and are located on the side wall, and the plurality of auxiliary windows are uniformly distributed at intervals.

In one embodiment, the speaker module includes an elastic sheet of an annular structure, the elastic sheet is arranged at the edge of the sound outlet, the base body is provided with an installation groove in the end part of the through hole, and the elastic sheet is clamped between the case and the groove wall of the installation groove.

In one embodiment, the amplification component includes a first net cover which is arranged on the resonant diaphragm, and a plurality of first air holes are formed in the first net cover; and the sound production component includes a chassis diaphragm, and a second net cover which is arranged on the chassis diaphragm, and a plurality of second air holes are formed in the second net cover.

In one embodiment, an outer edge is arranged on the base body, a plurality of limiting members used for being matched with the outer edge are arranged on the base body in an even distribution manner; torsional springs are arranged on the limiting members; and the limiting members are rotationally arranged on the base body by the torsional springs.

In one embodiment, the through hole is provided with a first end and a second end, the aperture of the first end is smaller than that of the second end, the through hole is in a circular truncated cone shape, and the speaker module is arranged at the first end.

A speaker module includes: a case, a sound production component, an amplification component and a control component; an accommodating cavity is formed in the case and has a sound outlet and an auxiliary window, and the auxiliary window is away from the sound outlet; the sound production component is accommodated in the accommodating cavity and located at the sound outlet; the amplification component is arranged on the case and located at the auxiliary window; the control component is arranged on the case;

the case is provided with a top wall and a side wall, the top wall is opposite to the sound outlet, an arc transition surface is arranged between the top wall and the side wall, and the top wall and the side wall are in curved surface connection by the arc transition surface; the amplification component includes a resonant diaphragm which blocks the auxiliary window; and the case is provided with a clamping portion at the sound outlet, and the clamping portion is of an annular structure.

In one embodiment, a stepped groove is formed in the edge of the auxiliary window, the resonant diaphragm is provided with a central portion and an edge portion, and the edge portion fits the inner wall of the stepped groove.

In one embodiment, the auxiliary window is located on the top wall, and the center of the auxiliary window coincides with the central axis of the accommodating cavity.

In one embodiment, a plurality of auxiliary windows are provided and are arranged on the side wall of the case, and the plurality of auxiliary windows are uniformly distributed at intervals on the side wall.

In one embodiment, the control component includes a Bluetooth module and a power amplifier module which are electrically connected; the power amplifier module is electrically connected to the sound production component; the Bluetooth module is used for receiving audio information; and the power amplifier module is used for carrying out signal processing on the audio information to drive the sound production component to produce sound.

In one embodiment, the control component can further include a wireless module. The wireless module is electrically connected to the power amplifier module and is used for receiving audio information.

In conclusion, the modular overhead embedded speaker and the speaker module provided by the present invention not only allow for convenient assembling and disassembling, enabling the individual replacement of the speaker module to decrease repairing cost, but also provide better bass performance.

BRIEF DESCRIPTION OF THE DRAWINGS

In order to clarify the technical solutions of the embodiments of the present invention, a brief introduction of the accompanying drawings used in the embodiments will be provided below.

DETAILED DESCRIPTION OF SOME EMBODIMENTS

In order to facilitate the understanding of the present invention, a more comprehensive description of the present invention will be provided below with reference to the relevant accompanying drawings. Those familiar with this technology can easily understand other advantages and effects of the present invention from the content disclosed in this specification. It is to be noted that the structure, proportion, size, etc. drawn in the accompanying drawings of this specification are only used for cooperating with the content revealed in the specification for the understanding and reading of those familiar with this technology, and are not used for limiting the limitations for implementing the present invention, so they have no technical substantive significance. Any modification of the structure, change of proportional relationship or adjustment of size, without affecting the efficacy that can be produced by the present invention and the purpose that can be achieved, shall still fall within the scope of the technical content revealed in the present invention. Moreover, the terms quoted in this specification, such as “up”, “down”, “left”, “right” and “middle”, are only for the convenience of description, and are not used for limiting the scope of the invention that can be implemented, and its relative relationship changes or adjustments. In the absence of substantive changes in the technical content, it shall also be regarded as the implementable scope of the present invention.

Unless otherwise defined, all technical and scientific terms used herein have the same meanings as generally understood by those skilled in the technical field of the present invention. The terms used in the description of the specification of the present invention herein are for the purpose of describing a specific embodiment and are not intended to limit the present invention. The terms “and/or” as used herein include any and all combinations of one or more related listed items.

Figure 1:
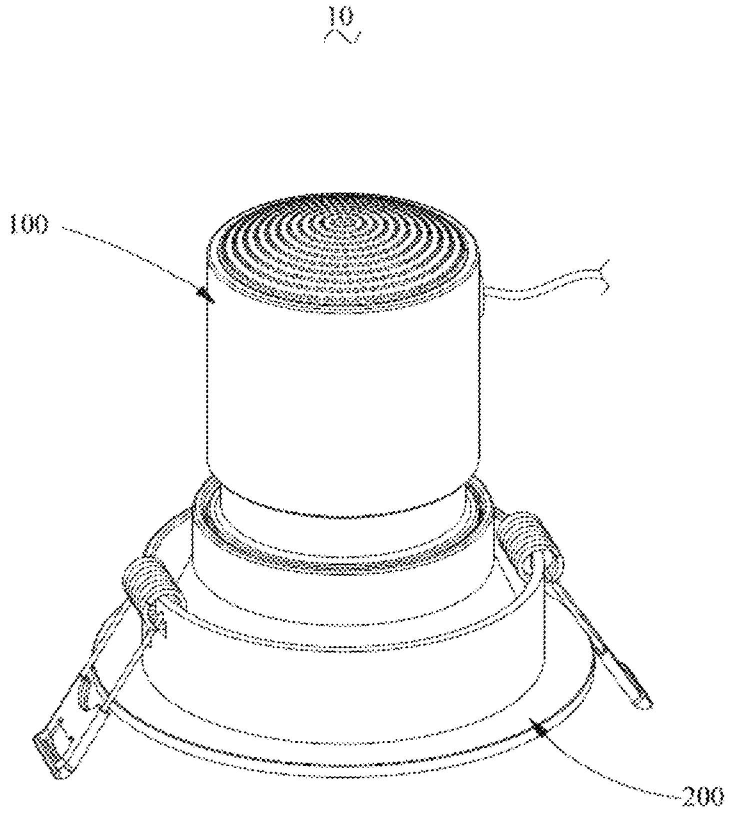
FIG. 1 is a schematic structural diagram of a modular overhead embedded speaker provided by the present invention.
Figure 2:
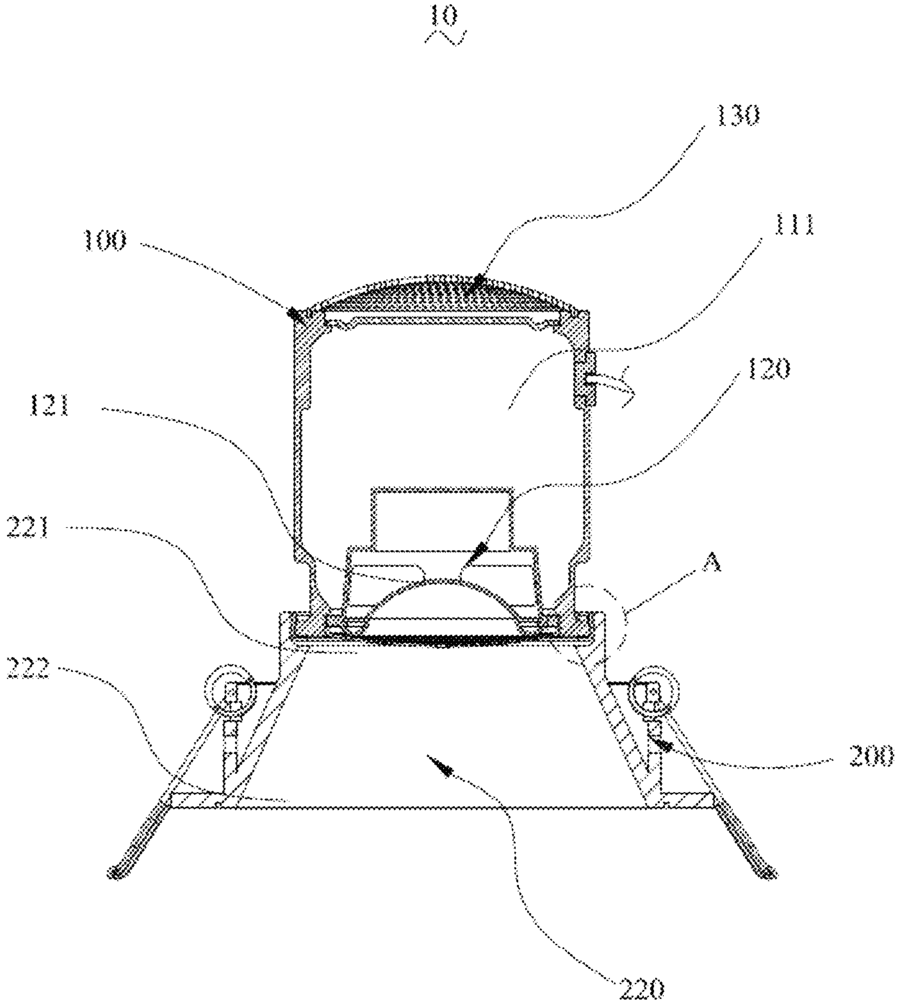
FIG. 2 is a sectional view of a modular overhead embedded speaker shown in FIG. 1.
Figure 3:
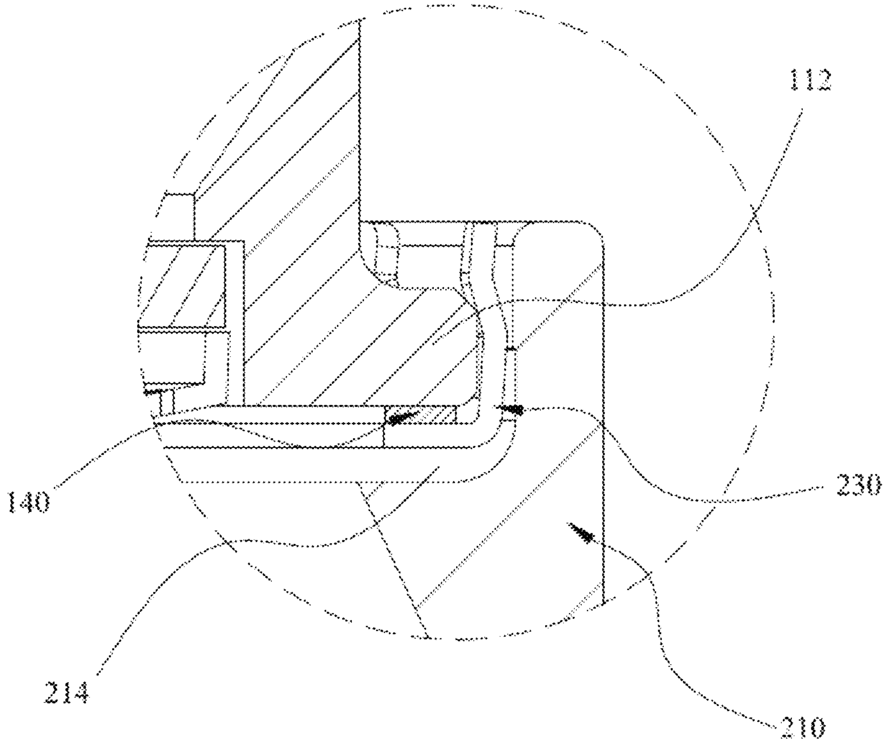
FIG. 3 is an amplified diagram of a part A in FIG. 2.

The present invention provides a modular overhead embedded speaker 10 which allows for convenient assembling and disassembling, enabling the individual replacement of a speaker module 100 to decrease repairing cost. As shown in FIG. 1 to FIG. 3, the modular overhead embedded speaker 10 includes the speaker module 100 and a base module 200, and the speaker module 100 is detachably arranged on the base module 200.

The speaker module 100 includes: a case 110, a sound production component 120 and an amplification component 130. An accommodating cavity 111 is formed in the case 110 and has a sound outlet 1111 facing a through hole 220, and an auxiliary window 1112 far away from the sound outlet 1111; and the sound production component 120 is accommodated in the accommodating cavity 111 and located at the sound outlet 1111.

The base module 200 includes a base body 210 on which the through hole 220 and a fastener structure 230 are arranged. The speaker module 100 is arranged at an end part of the through hole 220 by the fastener structure 230. Sound waves generated by the speaker module 100 can be propagated to the outside through the through hole 220.

In the packaging and transporting process, compared with a mode that the speaker module 100 and the base module 200 are combined and then packaged and transported together, the speaker module 100 and the base module 200 can be independently packaged and transported, which realize flexible packaging and transporting, needs a small space, and decreases the transportation cost.

In the actual use process, a user can fix the modular overhead embedded speaker 10 to an installation position on a ceiling, or a hanging bracket and the like, and the following description is conducted by taking the installation position on the ceiling as an example. During installation, the base module 200 is installed on the ceiling, and then the speaker module 100 is combined with the base module 200; and during replacing, it is only needed to replace the speaker module 100 or the base module 200, rather than completely disassembling for replacing, thereby decreasing the repairing cost.

In some embodiments, the speaker module 100 can also be replaced with a lamp, that is, the speaker module 100 is taken down from the base module 200, then the lamp is installed on the base module 200, and therefore the lighting function is achieved. The user can select to install the speaker module 100 or the lamp according to the actual situation, thus expanding the application range of the modular overhead embedded speaker 10.

Figure 5:
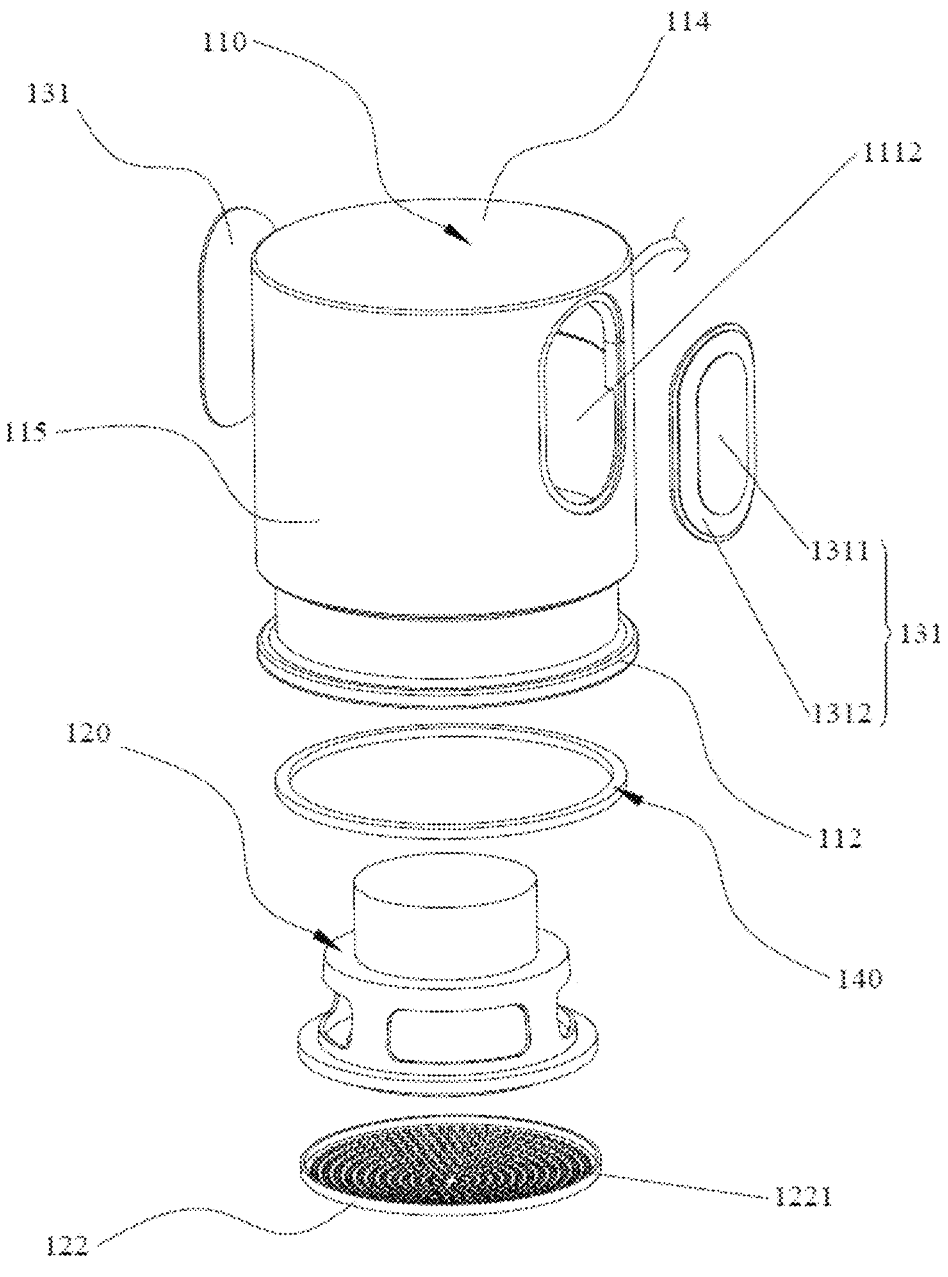
FIG. 5 is an exploded schematic diagram of a speaker module according to another embodiment.
Figure 6:
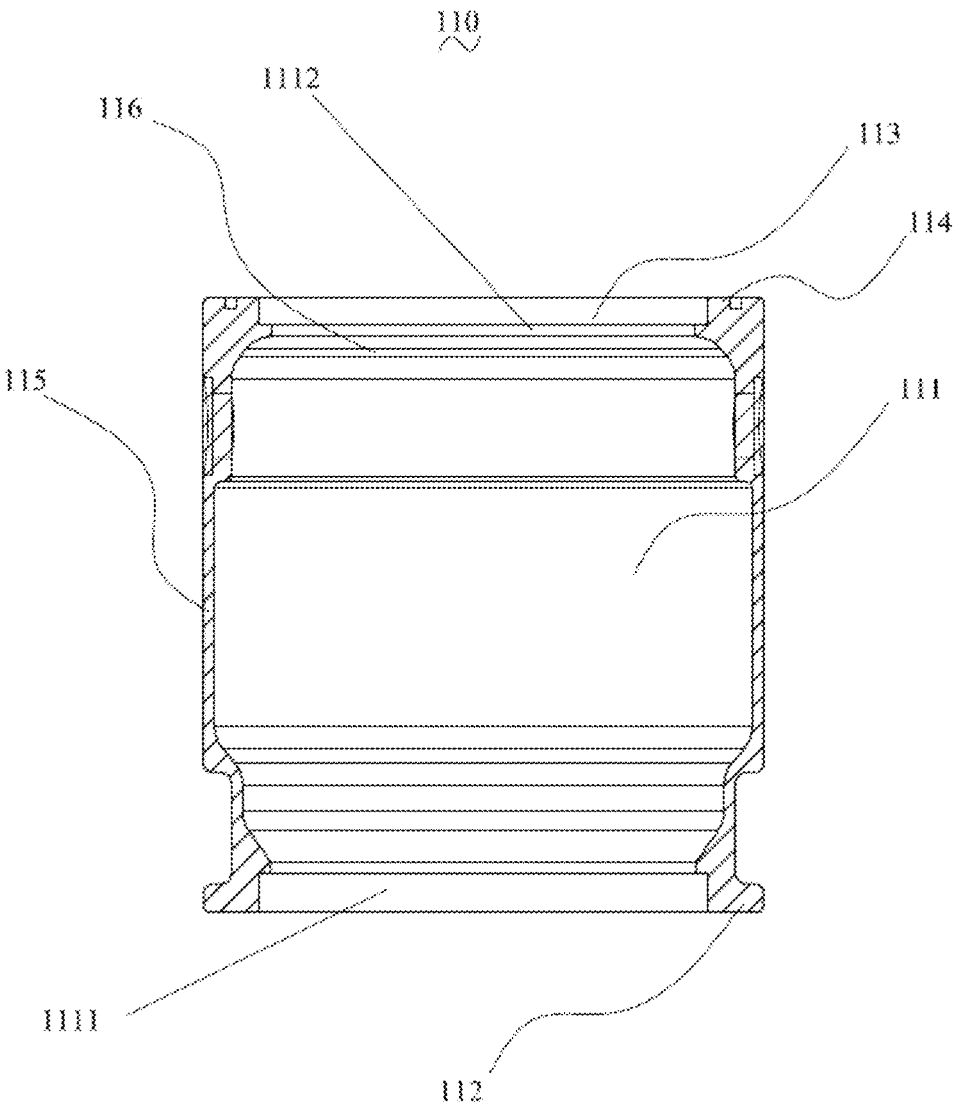
FIG. 6 is a sectional view of a case shown in FIG. 1.
Figure 7:
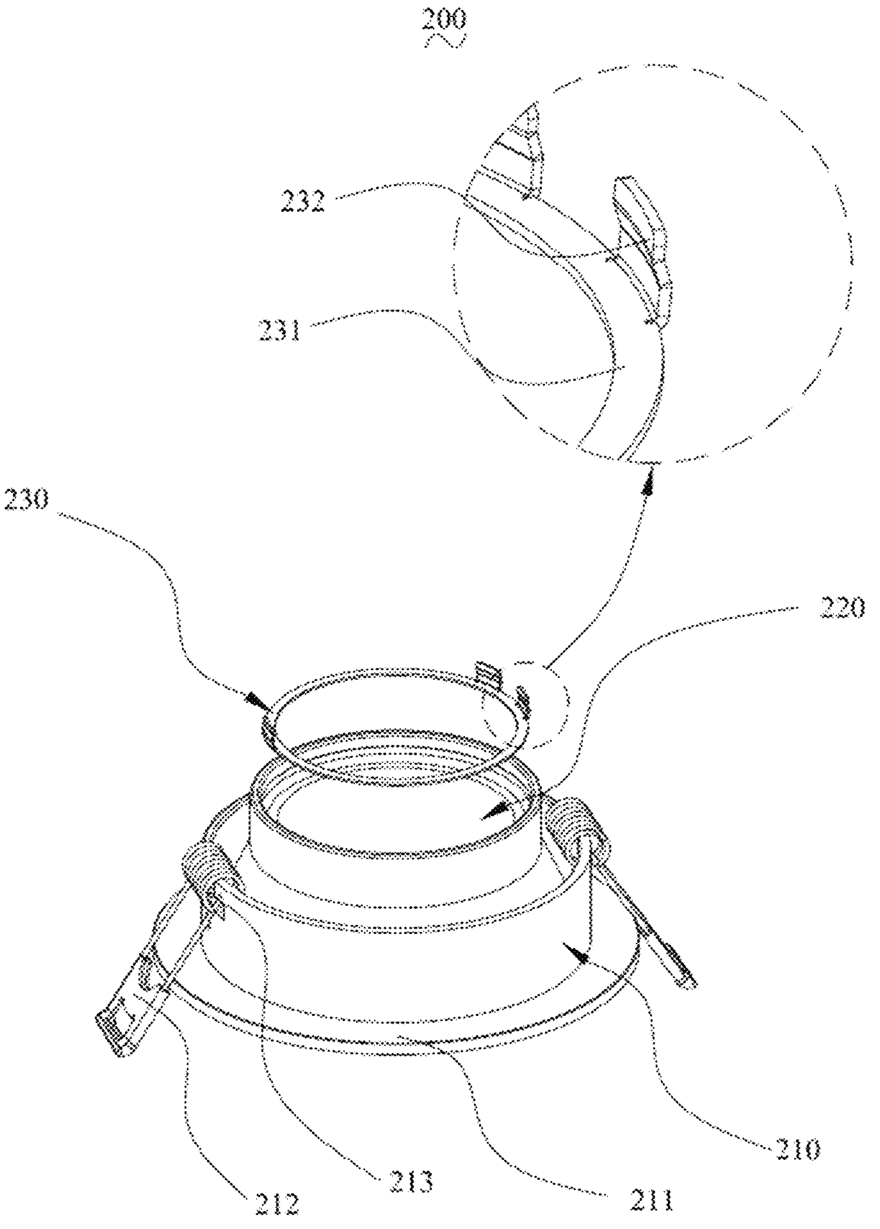
FIG. 7 is a schematic structural diagram of a base module shown in FIG. 1.
Figure 8:
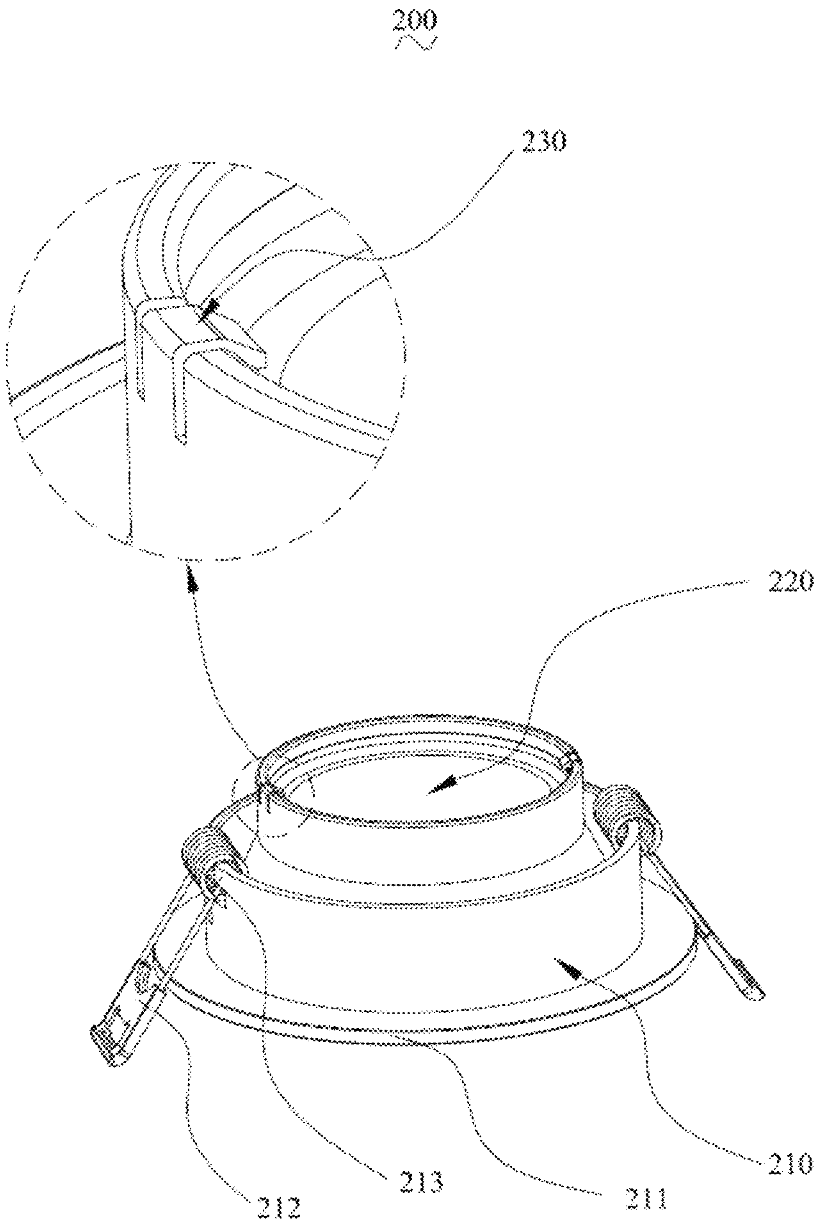
FIG. 8 is a schematic structural diagram of a base module according to another embodiment.

In order to achieve convenient and fast disassembling and assembling operation on the speaker module 100 and the base module 200, a connecting structure between the speaker module 100 and the base module 200 is specially designed in the present invention. As shown in FIG. 3 to FIG. 7, the case 110 is provided with a clamping portion 112 at the sound outlet 1111, and the clamping portion 112 is movably connected to the fastener structure 230. It is to be understood that at least part of the fastener structure 230 needs to be of an elastic structure so that the clamping portion 112 can be clamped, and the problem that the speaker module 100 falls off from the base module 200 is avoided. For this design, there are a plurality of implementation modes. Specifically, in one embodiment, as shown in FIG. 7, the fastener structure 230 is provided with a main body portion 231 and at least one elastic portion 232, the main body portion 231 is in an annular sheet shape and is fixedly connected to the base body 210, and the elastic portion 232 is installed on the main body portion 231. After the speaker module 100 and the base module 200 are combined and installed, the elastic portion 232 can abut against the clamping portion 112 and apply a downward acting force to the clamping portion 112, so as to limit the speaker module 100. Preferably, the clamping portion 112 is of an annular convex edge structure matched with the elastic portion 232, which avoids the problem that it is needed to adjust the angle for multiple times to align the clamping portion 112 with the elastic portion 232 in the installation process, and avoids the separation caused by vibration and rotation of the speaker module 100, thereby ensuring the connection stability;

in another embodiment, as shown in FIG. 8, a plurality of fastener structures 230 are provided and are integrally molded with the base body 210, and the plurality of fastener structures 230 have elasticity. After the speaker module 100 and the base module 200 are combined and installed, the fastener structures 230 can abut against the clamping portion 112 and apply the downward acting force to the clamping portion 112, so as to limit the speaker module 100. The plurality of of the fastener structures 230 can be provided and abut against the clamping portion 112 at the same time so that the stability of connection between the speaker module 100 and the base module 200 can be effectively ensured.

Figure 4:
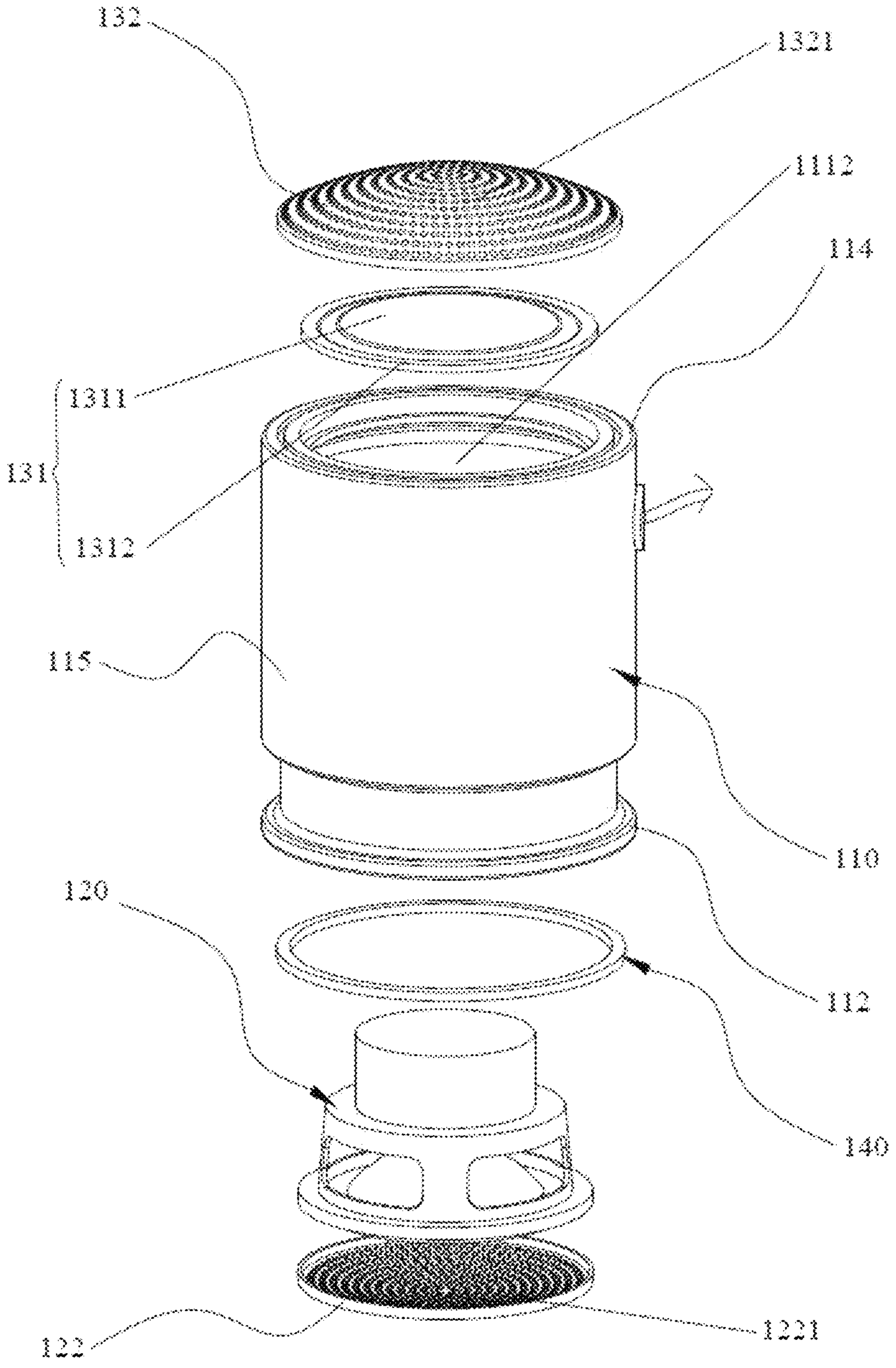
FIG. 4 is an exploded schematic diagram of a speaker module shown in FIG. 1.

Further, when the speaker module 100 and the base module 200 are used in combination, the following problems still exist, such as infirm connection and abnormal sound generated by vibration. Therefore, as shown in FIG. 3 to FIG. 5, the speaker module 100 is provided with an elastic sheet 140 of an annular structure, the elastic sheet 140 is arranged at the edge of the sound outlet 1111, the base body 210 is provided with an installation groove 214 in the end part of the through hole 220, and the elastic sheet 140 is clamped between the case 110 and the groove wall of the installation groove 214. This design has the following advantages:

1, due to inevitable machining errors, the problem of connection loosening caused by an overlarge fit clearance between the fastener structure 230 and the clamping portion 112 may occur, and after the elastic sheet 140 is arranged, it will be elastically deformed under extrusion, which makes up the machining errors, and eliminates the fit clearance between the fastener structure 230 and the clamping portion 112, thereby ensuring the connection reliability;

2, in the operation process, the speaker module 100 makes a sound and generates vibration, which will cause colliding with the base module 200, resulting in abnormal sound and influence to the sound quality, thus reducing the use experience of the user. By arranging the elastic sheet 140, the collision between the speaker module 100 and the base module 200 can be effectively reduced, so that abnormal sound is avoided, and the sound quality and the user experience are improved; and 3, the elastic sheet 140 is extruded to deform to tightly fit the case 110 and the groove wall of the installation groove 214, thus the sealing performance of the connection between the case 110 and the base body 210 is effectively ensured, and the problem that part of sound waves escape from the joint to influence the sound quality is avoided.

Furthermore, the modular overhead embedded speaker 10 provided by the present invention also has a better bass effect. As shown in FIG. 4 and FIG. 5, the amplification component 130 is arranged on the case 110 and located at the auxiliary window 1112. The amplification component 130 includes a resonant diaphragm 131 which blocks the auxiliary window 1112; and a sound production component 120 blocks the sound outlet 1111, so that the accommodating cavity 111 forms a closed cavity.

It is to be noted that the sound production component 120 includes a chassis diaphragm 121. The sound production component 120 pushes air to generate sound waves through the vibration of the chassis diaphragm 121, so as to realize sound production. Since the resonant diaphragm 131 and the chassis diaphragm 121 are located in the same closed accommodating cavity 111, when the chassis diaphragm 121 vibrates, the air pressure in the accommodating cavity 111 changes, and such air pressure change pushes the resonant diaphragm 131 to vibrate therewith. That is, the resonant diaphragm 131 also vibrates to produce sound, thereby enhancing the bass effect, and making the sound produced by the speaker module 100 stronger in stereoscopic impression.

In an existing ceiling speaker, an inner wall of a sound cavity is usually formed by directly connecting a plurality of flat wall surfaces, thus a corner structure with clear edges and corners similar to right angles and acute angles is usually formed, which makes the sound waves suffer from right-angle reflection or standing waves when propagating in the sound cavity. The standing waves will cause uneven local stress and unstable vibration of the resonant diaphragm 131, thereby affecting the bass quality.

In order to solve this problem, in the present invention, the corner structure in the accommodating cavity 111 is decreased. Specifically, as shown in FIG. 6, the case 110 has a top wall 114 and a side wall 115, the top wall 114 is opposite to the sound outlet 1111, an arc transition surface 116 is arranged between the top wall 114 and the side wall 115, and the top wall 114 and the side wall 115 are in curved surface connection by the arc transition surface 116. This design has the following advantages:

1, the corner structure in the accommodating cavity 111 is reduced, the arc transition surface 116 can guide the sound waves to diffuse uniformly along the tangential direction of the arc transition surface 116, thus the formed standing waves are decreased, the problem that the resonant diaphragm 131 is unevenly stressed due to the standing waves, resulting in mixed sound is avoided, for example, when there is one resonant diaphragm 131, the vibration of the single resonant diaphragm 131 is strong in some areas and weak in other areas, which leads to unstable vibration, resulting in mixed sound; when a plurality of resonant diaphragms 131 are provided, the vibration amplitudes of plurality of resonant diaphragms 131 may be different due to different stress conditions of the resonant diaphragms 131, resulting in mixed sound;

2, since the formed standing waves are decreased, the problem that the sound of specific frequency is abnormally amplified or attenuated due to the standing waves, resulting in turbid sound and fuzzy hierarchy is avoided, and therefore, the resonant sound generated in the accommodating cavity 111 is ensured to be clear; and 3, a situation that the air flowing quickly along with the vibration of the chassis diaphragm 121 in the accommodating cavity 111 suddenly turns to form turbulence when passing through the corner structure in the sound production process is avoided, thus the generated noise is reduced, and the purity of sound is ensured.

Further, as shown in FIG. 4 to FIG. 6, the case 110 is provided with a stepped groove 113 at the edge of the auxiliary window 1112; and the resonant diaphragm 131 is provided with a central portion 1311, and an edge portion 1312 which fits the inner wall of the stepped groove 113. The resonant diaphragm 131 is in a status of "fixed periphery and suspended middle" at this moment, that is, the edge portion 1312 is connected to the stepped groove 113, and the central portion 1311 is suspended. At this moment, the central portion 1311 can minimize the contact with other structures, thus preventing vibration energy from being absorbed or lost by other structures. When the chassis diaphragm 121 vibrates, the central portion 1311 can vibrate freely together, the vibration amplitude can be larger, and the vibration transmission efficiency can be higher, thereby effectively enhancing the bass effect.

Preferably, as shown in FIG. 4, the auxiliary window 1112 can be located on the top wall 114, and the center of the auxiliary window 1112 coincides with the central axis of the accommodation cavity 111. It is to be understood that the resonant diaphragm 131 is relatively far away from the chassis diaphragm 121, so that the overall stress of the resonant diaphragm 131 is balanced, thereby efficiently amplifying the low-frequency energy and enhancing the bass effect.

In other embodiments, as shown in FIG. 5, a plurality of auxiliary windows 1112 can be located on the side wall 115 and are evenly distributed at intervals. It is to be understood that more resonant diaphragms 131 are provided at this moment, thus more air can be pushed to form stronger sound waves, and such sound waves have more obvious impact force on human ears and make better hearing.

As shown in FIG. 4, the amplification component 130 includes a first net cover 132 which is arranged on the resonant diaphragm 131, and a plurality of first air holes 1321 are formed in the first net cover 132. The first net cover 132 can protect the resonant diaphragm 131; and by arranging the plurality of first air holes 1321, the sound waves can be effectively transmitted out, meanwhile, the air pressure change of a space between the first net cover 132 and the resonant diaphragm 131 is avoided, which avoids the influence on the vibration of the resonant diaphragm 131, thereby ensuring the sound effect.

As shown in FIG. 4 and FIG. 5, the sound production component 120 includes a second net cover 122 which is arranged on a chassis diaphragm 121, and a plurality of second air holes 1221 are formed in the second net cover 122. The function of the second net cover 122 is similar to that of the first net cover 132, namely, the protection can be implemented on the chassis diaphragm 121, and moreover, the influence on the vibration of the chassis diaphragm 121 can be avoided.

In order to realize the fast disassembling and assembling of the base body 210 relative to the ceiling, as shown in FIG. 7 and FIG. 8, an outer edge 211 is arranged on the base body 210, a plurality of limiting members 212 for being matched with the outer edge 211 are arranged on the base body 210 in an even distribution manner; torsion springs 213 are arranged on the limiting members 212; and the limiting members 212 are rotationally arranged on the base body 210 by the torsion springs 213.

When in use, the user forms an installation hole in the ceiling, and the diameter of the installation hole is slightly smaller than the outer diameter of the outer edge 211. In the actual installation process, the user only needs to apply a force to twist the limiting members 212 to make the limiting members 212 stressed to rotate, and then extends the base module 200 into the installation hole until the limiting members 212 are located on the inner side of the installation hole and then release the hands, and at this moment, the limiting members 212 automatically reset by means of the elastic force of the torsion springs 213, so as to cooperate with the outer edge 211 to be clamped on the ceiling. In a case of disassembling, the user only needs to apply a force to twist the limiting members 212 and take out the modular overhead embedded speaker 10 from the installation hole. Therefore, the fast disassembling and assembling of the modular overhead embedded speaker 10 relative to the ceiling are realized, and the operation is simple.

As shown in FIG. 2, the through hole 220 has a first end 221 and a second end 222, the aperture of the first end 221 is smaller than the aperture of the second end 222, the through hole 220 is in a circular truncated cone shape, and the speaker module 100 is arranged on the first end 221. Therefore, the through hole 220 forms a structure similar to a horn, which has a sound amplification effect on the sound emitted by the sound production component 120, thereby improving the propagation efficiency of sound waves.

The present invention provides a speaker module 100. As shown in FIG. 4 to FIG. 6, the speaker module 100 includes: a case 110, a sound production component 120, an amplification component 130 and a control component 150; an accommodating cavity 111 is formed in the case 110 and has a sound outlet 1111 and an auxiliary window 1112; the auxiliary window 1112 is far away from the sound outlet 1111; the sound production component 120 is accommodated in the accommodating cavity 111 and is located at the sound outlet 1111; and the amplification component 130 is arranged on the case 110 and is located at the auxiliary window 1112. The case 110 is provided with a clamping portion 112 at the sound outlet 1111, and the clamping portion 112 is of an annular convex edge structure. Therefore, the case 110 can be conveniently connected to other structures.

As shown in FIG. 4 and FIG. 5, the amplification component 130 includes a resonant diaphragm 131 which blocks the auxiliary window 1112, so that the accommodating cavity 111 forms a closed cavity. When the sound production component 120 operates, the air pressure in the accommodating cavity 111 changes, such air pressure change can push the resonant diaphragm 131 to vibrate, and then sound is generated, so that the bass effect is enhanced, and the sound emitted by the speaker module 100 has stronger stereoscopic impression.

Moreover, in the present invention, the corner structure in the accommodating cavity 111 is reduced. Specifically, as shown in FIG. 6, the case 110 has a top wall 114 and a side wall 115, the top wall 114 is opposite to the sound outlet 1111, an arc transition surface 116 is arranged between the top wall 114 and the side wall 115, and the top wall 114 and the side wall 115 are in curved surface connection by the arc transition surface 116. This design has the following advantages:

1, the corner structure in the accommodating cavity 111 is reduced, the arc transition surface 116 can guide the sound waves to diffuse uniformly along the tangential direction of the arc transition surface 116, thus the formed standing waves are decreased, the problem that the resonant diaphragm 131 is unevenly stressed due to the standing waves, resulting in mixed sound is avoided;

2, since the formed standing waves are decreased, the problem that the sound of specific frequency is abnormally amplified or attenuated due to the standing waves, resulting in turbid sound and fuzzy hierarchy is avoided, and therefore, the resonant sound generated in the accommodating cavity 111 is ensured to be clear; and 3, a situation that the air flowing quickly along with the vibration of the chassis diaphragm 121 in the accommodating cavity 111 suddenly turns to form turbulence when passing through the corner structure in the sound production process is avoided, thus the generated noise is reduced, and the purity of sound is ensured.

Further, as shown in FIG. 4 to FIG. 6, the case 110 is provided with a stepped groove 113 at the edge of the auxiliary window 1112; and the resonant diaphragm 131 is provided with a central portion 1311, and an edge portion 1312 which fits the inner wall of the stepped groove 113. At this moment, the central portion 1311 can minimize the contact with other structures, thus preventing vibration energy from being absorbed or lost by other structures.

Preferably, as shown in FIG. 4, the auxiliary window 1112 is located on the top wall 114, and the center of the auxiliary window 1112 coincides with the central axis of the accommodating cavity 111. In other embodiments, as shown in FIG. 5, a plurality of auxiliary windows 1112 are provided and are arranged on the side wall 115 of the case 110, and the plurality of auxiliary windows 1112 are uniformly distributed at intervals on the side wall 115.

Further, in order to facilitate the control of the user on the speaker module 100, the control component 150 can be arranged on the case 110. Preferably, the control component 150 can be arranged outside the accommodating cavity 111, thus avoiding the problem that the sound quality is influenced by the control component 150 arranged in the accommodating cavity 111.

Figure 9:
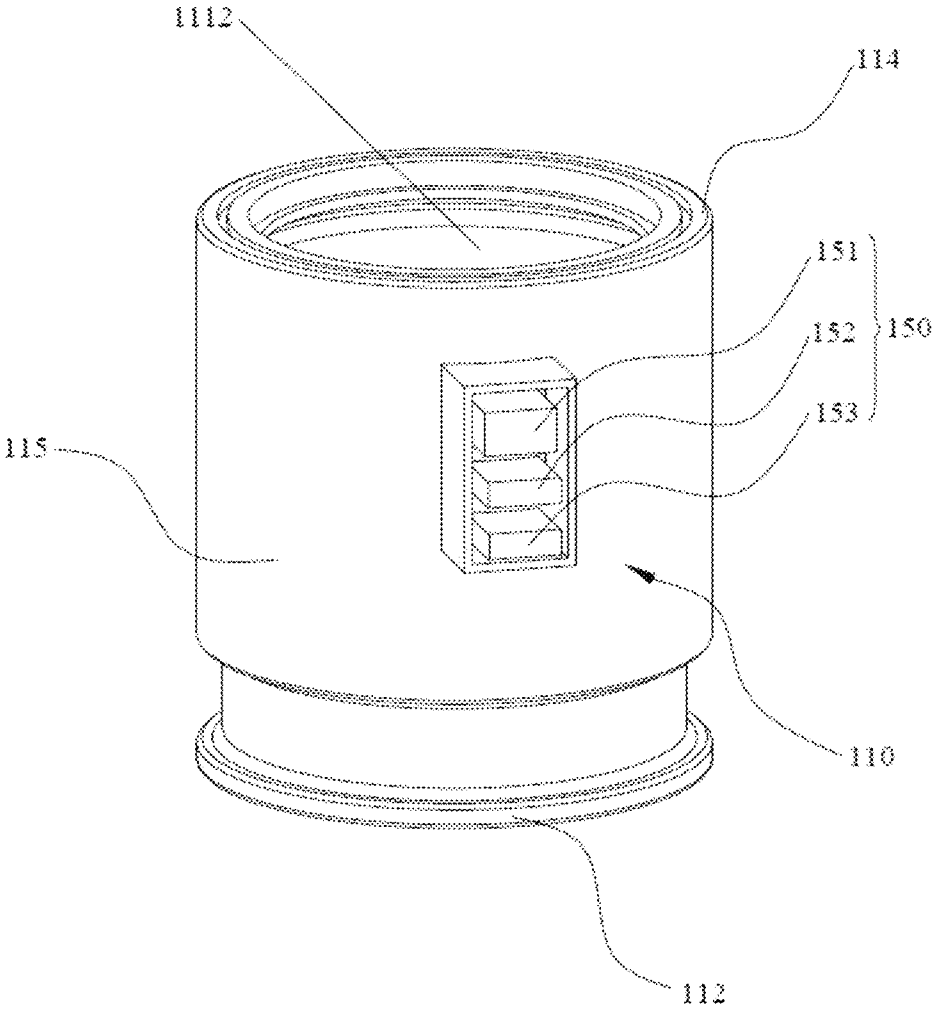
FIG. 9 is a schematic structural diagram of a case and a control component.
Figure 10:
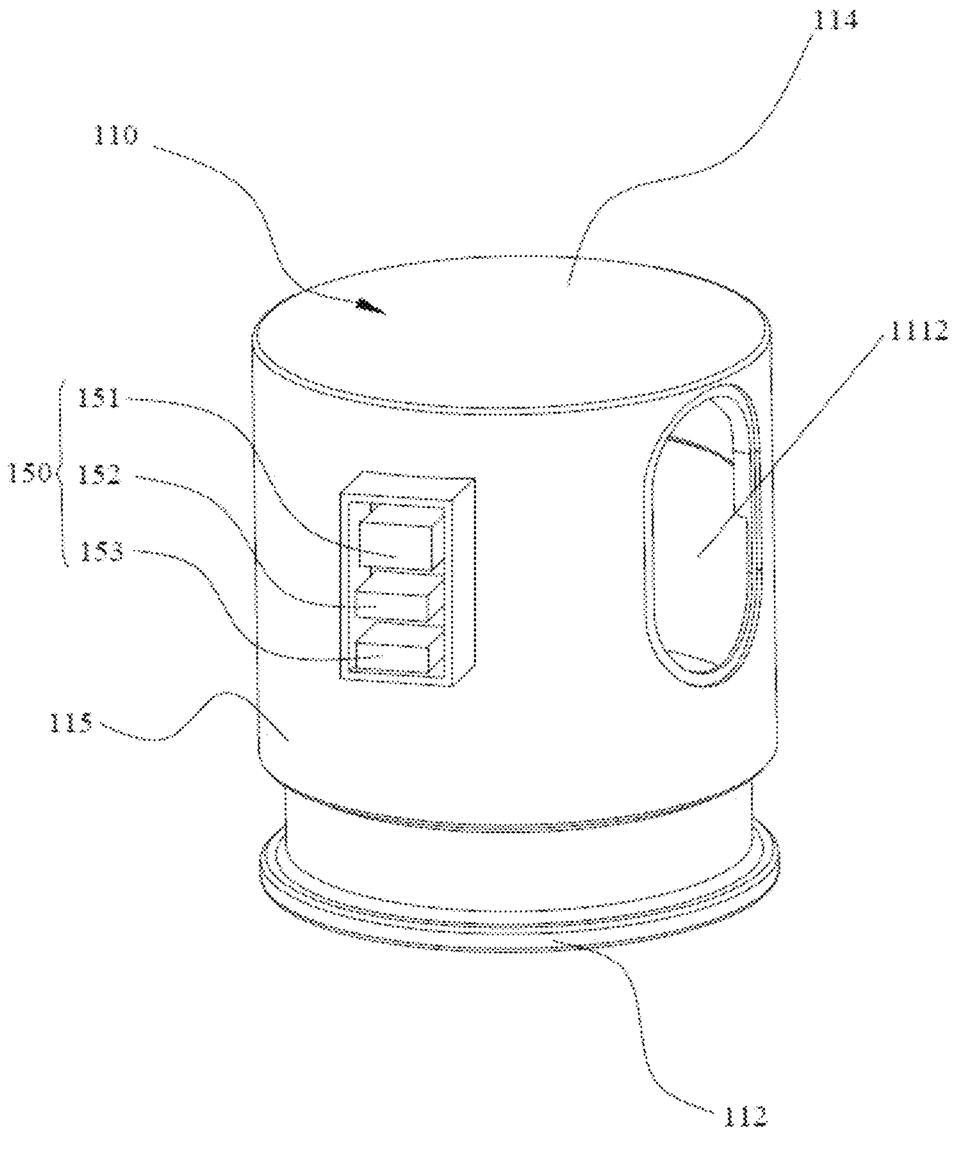
FIG. 10 is a schematic structural diagram of a case and a control component according to another embodiment.

As shown in FIG. 9 and FIG. 10, the control component 150 includes a Bluetooth module 151 and a power amplifier module 152 which are electrically connected; the power amplifier module 152 is electrically connected to the sound production component 120; the Bluetooth module 151 is used for receiving audio information; and the power amplifier module 152 is used for carrying out signal processing on the audio information to drive the sound production component 120 to produce sound so as to achieve the sound playing function of the speaker module 100.

The speaker module 100 can be connected to devices which also have a Bluetooth connection function by the Bluetooth module 151, such as a mobile phone, a tablet personal computer or a notebook computer; and the user can control the speaker module 100 by the device such as the mobile phone, thus the convenience of the user using the speaker module 100 is improved; and moreover, the control component 150 can replace a traditional connecting wire rod, which avoids the problem that the wire rod is disordered and easy to wind due to excessive connecting wire rods of the speaker module 100.

As shown in FIG. 9 and FIG. 10, the control component 150 can further include a wireless module 153. The wireless module 153 is electrically connected to the power amplifier module 152 and is used for receiving audio information.

In conclusion, the modular overhead embedded speaker 10 and the speaker module 100 provided by the present invention not only allow for convenient assembling and disassembling, enabling the individual replacement of the speaker module 100 to decrease repairing cost, but also provide better bass performance.

The above embodiments only express several embodiments of the present invention, and their descriptions are more specific and detailed, but they cannot be understood as limiting the scope of the invention patent. It is to be noted that for those skilled in the art, several modifications and improvements can be made without departing from the concepts of the present invention, and these all fall within the protective scope of the present invention. Therefore, the scope of protection of this patent should be determined according to the appended claims.

What is claimed is:

1. A modular overhead embedded speaker, comprising a base module, and a speaker module which is detachably arranged on the base module, wherein the base module comprises a base body on which a through hole and a fastener structure are arranged, and the speaker module is arranged at an end part of the through hole by the fastener structure;

the speaker module comprises: a case, a sound production component and an amplification component; an accommodating cavity is formed in the case and has a sound outlet facing the through hole, and an auxiliary window opposite to the sound outlet, the sound production component is accommodated in the accommodating cavity and is located at the sound outlet, and the amplification component is arranged on the case and is located at the auxiliary window;

the amplification component comprises a resonant diaphragm which blocks the auxiliary window; and the case is provided with a clamping portion at the sound outlet, wherein the clamping portion is of an annular convex edge structure protruded at an outer side of the case, wherein the fastener structure is provided with at least one elastic portion, wherein when the base module is assembled with the speaker module, the at least one elastic portion is elastically abutting against an outer side of the clamping portion, wherein the speaker module further comprises an elastic sheet which is of an annular structure, the elastic sheet is arranged at an edge of the sound outlet and is abutting against the clamping portion, the base body is provided with an installation groove in an end part of the through hole, and the elastic sheet is clamped at the installation groove between ends of the clamping portion and the base body at an inner side of the at least one elastic portion.

2. The modular overhead embedded speaker according to claim 1, wherein the case is provided with a top wall and a side wall, the top wall is opposite to the sound outlet, an arc transition surface is arranged between the top wall and the side wall, and the top wall and the side wall are in curved surface connection by the arc transition surface, wherein the arc transition surface is located adjacent to the resonant diaphragm, surrounding the auxiliary window and defining a part of an inner wall of the accommodating cavity, wherein the arc transition surface and the resonant diaphragm seal a top of the accommodating cavity in the case, wherein the sound production component blocks the sound outlet to seal a bottom of the accommodating cavity, so as to allow the accommodating cavity to be formed as a closed cavity.

3. The modular overhead embedded speaker according to claim 2, wherein the fastener structure is provided with a main body portion and the at least one elastic portion, the main body portion is an annular sheet and is fixedly connected to the base body, the at least one elastic portion is installed on the main body portion.

4. The modular overhead embedded speaker according to claim 2, wherein a plurality of fastener structures are provided and are integrally molded with the base body, and have elasticity.

5. The modular overhead embedded speaker according to claim 2, wherein the case is provided with a stepped groove at an edge of the auxiliary window, the resonant diaphragm is provided with a central portion and an edge portion, and the edge portion fits an inner wall of the stepped groove.

6. The modular overhead embedded speaker according to claim 5, wherein the auxiliary window is located on the top wall, and a center of the auxiliary window coincides with a central axis of the accommodating cavity.

7. The modular overhead embedded speaker according to claim 5, wherein a plurality of side auxiliary windows are provided and are located on the side wall, and the plurality of side auxiliary windows are uniformly distributed at intervals.

8. The modular overhead embedded speaker according to claim 1, wherein the amplification component comprises a first net cover which is arranged on the resonant diaphragm, and a plurality of first air holes are formed in the first net cover; and the sound production component comprises a chassis diaphragm, and a second net cover which is arranged on the chassis diaphragm, and a plurality of second air holes are formed in the second net cover.

9. The modular overhead embedded speaker according to claim 1, wherein an outer edge is circumferentially protruded and arranged on the base body, a plurality of limiting members used for being matched with the outer edge are arranged on the base body in an even distribution manner; torsional springs are arranged on the limiting members; and the limiting members are rotationally arranged on the base body by the torsional springs.

10. The modular overhead embedded speaker according to claim 1, wherein the through hole is provided with a first end and a second end, the aperture of the first end is smaller than that of the second end, the through hole is in a circular truncated cone shape, and the speaker module is arranged on the first end.

11. A speaker module, comprising: a case, a sound production component, an amplification component and a control component, wherein an accommodating cavity is formed in the case and has a sound outlet and an auxiliary window opposite to the sound outlet; the sound production component is accommodated in the accommodating cavity and located at the sound outlet; the amplification component is arranged on the case and located at the auxiliary window; the control component is arranged on the case;

the case is provided with a top wall and a side wall, the top wall is opposite to the sound outlet, an arc transition surface is arranged between the top wall and the side wall, and the top wall and the side wall are in curved surface connection by the arc transition surface; the amplification component comprises a resonant diaphragm which blocks the auxiliary window, wherein the arc transition surface is located adjacent to the resonant diaphragm, surrounding the auxiliary window and defining a part of an inner wall of the accommodating cavity, wherein the arc transition surface and the resonant diaphragm seal a top of the accommodating cavity in the case, wherein the sound production component blocks the sound outlet to seal a bottom of the accommodating cavity, so as to allow the accommodating cavity to be formed as a closed cavity; and the case is provided with a clamping portion at the sound outlet, and the clamping portion is of an annular convex edge structure.

12. The speaker module according to claim 11, wherein a stepped groove is formed in an edge of the auxiliary window, the resonant diaphragm is provided with a central portion and an edge portion, and the edge portion fits an inner wall of the stepped groove.

13. The speaker module according to claim 11, wherein the auxiliary window is located on the top wall, and a center of the auxiliary window coincides with a central axis of the accommodating cavity.

14. The speaker module according to claim 11, wherein a plurality of side auxiliary windows are provided and are arranged on the side wall of the case, and the plurality of side auxiliary windows are uniformly distributed at intervals on the side wall.

15. The speaker module according to claim 11, wherein the control component comprises a Bluetooth module and a power amplifier module which are electrically connected; the power amplifier module is electrically connected to the sound production component; the Bluetooth module is used for receiving audio information; and the power amplifier module is used for carrying out signal processing on the audio information to drive the sound production component to produce sound.

16. The speaker module according to claim 15, wherein the control component comprises a wireless module which is electrically connected to the power amplifier module and is used for receiving the audio information.

* * * * *